United States Patent
Verhoog et al.

(10) Patent No.: US 9,068,624 B2
(45) Date of Patent: Jun. 30, 2015

(54) TORSION DAMPING DEVICE FOR MOTOR VEHICLE TRANSMISSION

(75) Inventors: Roel Verhoog, Gournay sur Aronde (FR); Michael Hennebelle, Houdain (FR); Giovanni Grieco, Colombes (FR); Norberto Termenon, Paris (FR)

(73) Assignee: VALEO EMBRAYAGES, Amiens Cedex (FR)

( * ) Notice: Subject to any disclaimer, the term of this patent is extended or adjusted under 35 U.S.C. 154(b) by 0 days.

(21) Appl. No.: 14/124,193

(22) PCT Filed: Apr. 25, 2012

(86) PCT No.: PCT/FR2012/050917
§ 371 (c)(1),
(2), (4) Date: Dec. 5, 2013

(87) PCT Pub. No.: WO2012/168604
PCT Pub. Date: Dec. 13, 2012

(65) Prior Publication Data
US 2014/0113733 A1    Apr. 24, 2014

(30) Foreign Application Priority Data
Jun. 7, 2011   (FR) .................................. 11 54966

(51) Int. Cl.
F16F 15/121   (2006.01)
F16F 15/12    (2006.01)
F16F 15/14    (2006.01)

(52) U.S. Cl.
CPC ............... *F16F 15/12* (2013.01); *F16F 15/145* (2013.01)

(58) Field of Classification Search
USPC ......... 464/3, 66.1, 68.1, 68.2; 192/3.28–3.31, 192/201; 60/338
See application file for complete search history.

(56) References Cited

U.S. PATENT DOCUMENTS

| 2,632,318 | A | * | 3/1953 | Meyer | 464/66.1 |
| 4,383,596 | A | * | 5/1983 | Jackel | 192/3.31 |
| 8,579,093 | B2 | * | 11/2013 | Maienschein et al. | 192/3.28 |
| 2010/0269497 | A1 | | 10/2010 | Engelmann et al. | |

FOREIGN PATENT DOCUMENTS

DE    200810057647    6/2009

* cited by examiner

*Primary Examiner* — Gregory Binda
(74) *Attorney, Agent, or Firm* — Berenato & White, LLC

(57) ABSTRACT

A torsion damping device (10), in particular for a motor vehicle transmission, wherein the damping device (10) comprises at least two pendulum oscillators, a first washer (24A) having at least one first pendulum oscillator (P1) and a second washer (24B) having at least one second pendulum oscillator (P2).

13 Claims, 8 Drawing Sheets

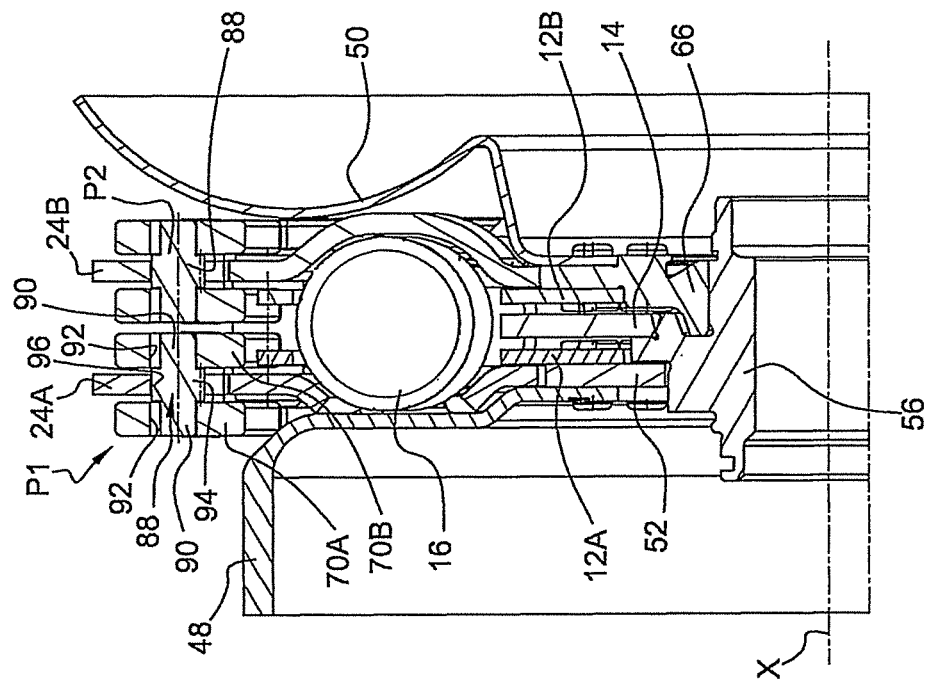
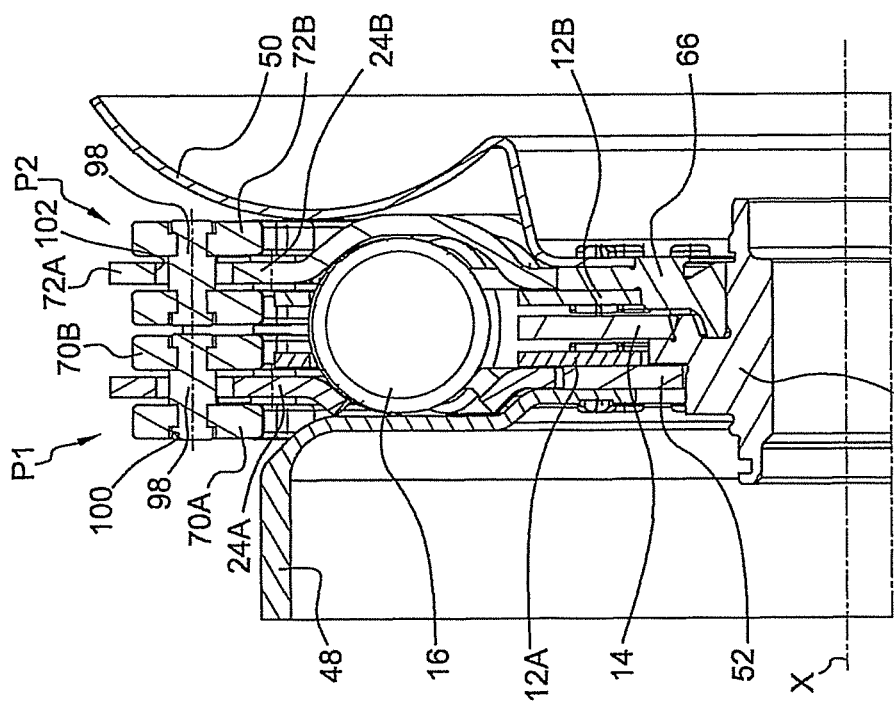

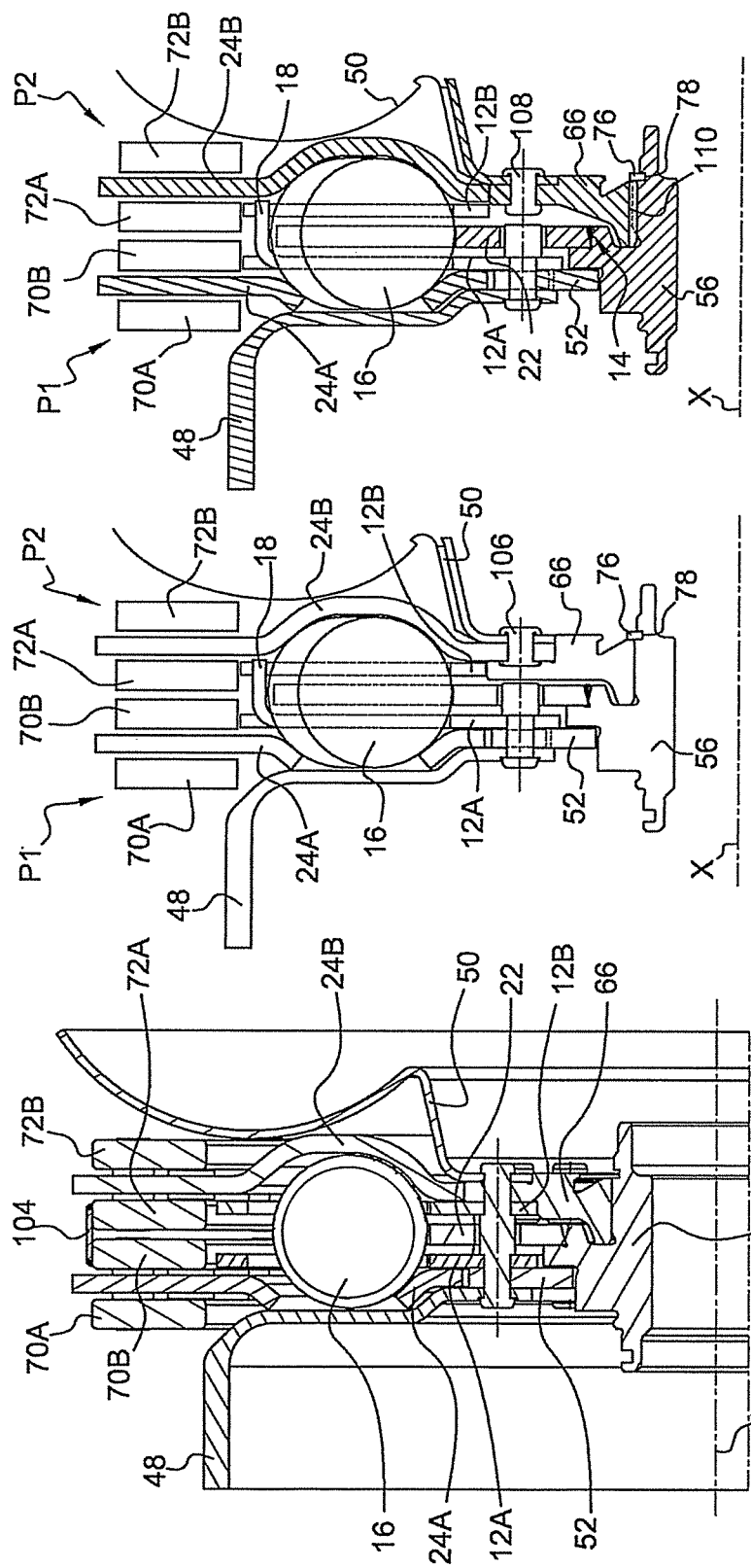

TORSION DAMPING DEVICE FOR MOTOR VEHICLE TRANSMISSION

CROSS-REFERENCE TO RELATED APPLICATIONS AND CLAIM TO PRIORITY

This application is a national stage application of International Application No. PCT/FR2012/050917 filed Apr. 25, 2012, which claims priority to French Patent Application No. 1154966 filed Jun. 7, 2011, of which the disclosures are incorporated herein by reference and to which priority is claimed.

FIELD OF THE INVENTION

The invention relates to a torsion damping device, in particular for a motor vehicle transmission.

The invention relates more particularly to a torsion damping device exhibiting an axially oriented rotation axis and having at least
- an input element capable of being rotationally driven by a driving shaft,
- an output element having at least one web rotationally linked to a driven shaft,
- circumferentially acting elastic members interposed between the input element and output element, and
- first and second washers that, capable of interacting with the elastic members, are mounted freely rotatably with respect to the input and output elements.

BACKGROUND OF THE INVENTION

A number of examples of damping devices of this kind, generally being part of a motor vehicle transmission, are known from the existing art.

In an automobile transmission, a torsion damping device of this kind is associated with a clutch capable of selectively connecting the engine to the gearbox, such as a friction clutch or a hydrokinetic coupling apparatus having a locking clutch, in order to filter out vibrations due to engine irregularities.

This is because a combustion engine exhibits irregularities due to the succession of combustion events in the engine cylinders, said irregularities varying in particular depending on the number of cylinders.

The function of the damping means of a torsion damping device is consequently to filter the vibrations caused by the irregularities, and they act before the engine torque has been transmitted to the gearbox.

Vibrations penetrating into the gearbox would otherwise cause therein, during operation, particularly undesirable shocks, noises, or acoustic impacts.

This is one of the reasons why one or more damping means, capable of filtering vibrations at at least one determined frequency, are used.

In the sector of transmissions, research toward achieving increasingly effective filtration has resulted, for certain applications, in the addition of a pendulum oscillator to the damping devices conventionally utilized both in friction clutches and in motor-vehicle hydrokinetic coupling apparatuses.

A pendulum oscillator, also called a "pendulum," has at least one mass or flyweight, generally several, that is arranged around the rotation axis of the engine shaft and is free to oscillate around a notional axis substantially parallel to the rotation axis of the engine shaft.

When the masses of a pendulum oscillator react to rotational inconsistencies, they oscillate in such a way that the center of gravity of each of said pendulum masses oscillates around an axis substantially parallel to the rotation axis of the engine shaft.

The radial position of the center of gravity of each pendulum mass with respect to the rotation axis of the engine shaft, as well as the distance of said center of gravity with respect to the notional oscillation axis, are established so that in response to centrifugal forces, the oscillation frequency of each of the pendulum masses is proportional to the rotation speed of the engine shaft; said multiple can assume, for example, a value close to the predominant harmonic order of the vibrations responsible for strong rotational inconsistencies in the vicinity of idle speed.

SUMMARY OF THE INVENTION

The purpose of the present invention is very specifically to propose a damping device that allows further improvements in the results obtained, while in particular maintaining a small overall size.

For that purpose, the invention proposes a torsion damping device of the kind cited previously, characterized in that the damping device has at least two pendulum oscillators, the first washer having at least one first pendulum oscillator and the second washer having at least one second pendulum oscillator.

Thanks to the invention, the damping device improves the filtering of vibrations, and the pendulum oscillators are advantageously carried by the washers of the damping device that respectively provide, with respect to the elastic members, on the one hand a phasing function and on the other hand a guidance function.

Advantageously, a washer of this kind performing a dual (phasing and guidance) function allows a reduction in the parts count of the damping device, and allows the axial dimensions of the device to be optimized.

Advantageously, said washers of the damping device are arranged axially at the front and rear ends of the damping device, in order to be spaced as far away as possible from one another for a given overall axial size of the damping device.

The masses of each of the first and second pendulum oscillators can thus be maximal, in particular when said masses of the first and second pendulum oscillators are arranged on the same diameter with respect to the axis X.

Because of the criteria to be met in order to perform the two aforesaid functions, said washers of the damping device are parts that are capable of supporting the pendulum oscillator masses and can yield a damping device that is particularly compact both axially and radially.

According to other characteristics of the invention:
- the first pendulum oscillator carried by the first washer has at least one pendulum mass mounted oscillatingly with respect to the first washer, and the second pendulum oscillator carried by the second washer has at least one pendulum mass mounted oscillatingly with respect to the second washer;
- the first pendulum oscillator and the second pendulum oscillator are tuned differently, respectively a first tuning order for the first pendulum oscillator and a second tuning order for the second pendulum oscillator;
- the first pendulum oscillator and the second pendulum oscillator are tuned so as to exhibit the same tuning order, the first pendulum oscillator exhibiting a first tuning order identical to the second tuning order of the second pendulum oscillator;
- the first pendulum oscillator and the second pendulum oscillator are mutually synchronized by means of synchronization means connecting said at least one pendulum mass of the first pendulum oscillator to said at least one pendulum mass of the second pendulum oscillator;

said at least one pendulum mass of at least one of said first and second pendulum oscillators has at least two flyweights that are arranged axially on either side of the associated washer;

the value of the mass of said at least one pendulum mass of the first pendulum oscillator is different from the value of the mass of said at least one pendulum mass of the second pendulum oscillator;

the value of the mass of said at least one pendulum mass of the first pendulum oscillator is equal to the value of the mass of said at least one pendulum mass of the second pendulum oscillator;

the input element has a first input disk and a second input disk that are rotationally linked by linking means;

the first and second input disks are arranged axially on either side of said at least one output element, and the first and second input disks are respectively arranged axially between said at least one output element and the associated washer, the first washer being arranged axially in front of the first input disk, and the second washer being arranged axially behind the second input disk.

Advantageously, the damping device according to the invention is part of a hydrokinetic coupling apparatus having a turbine, and the input element of the damping device is rotationally linked to the turbine.

The turbine is rotationally linked to a turbine hub and to the second input disk by fastening means such as rivets.

As a variant, when the damping device according to the invention is part of a hydrokinetic coupling device having a turbine, at least the second washer carrying the second pendulum oscillator is rotationally linked to the turbine.

The turbine is rotationally linked to the second washer by means of fastening means such as rivets.

According to another variant, when the damping device according to the invention is part of a hydrokinetic coupling device having a turbine, the output element of the damping device is rotationally linked to the turbine directly or by means of a turbine hub.

Preferably the turbine is rotationally linked to the turbine hub by fastening means such as rivets, and the turbine hub is rotationally linked by coupling means directly to the driven shaft, or by means of an output hub of the damping device.

The coupling means between the turbine hub and the output hub of the damping device are implemented by geometric interaction, particularly by means of complementary splines comprised respectively by the turbine hub and output hub.

As a variant, the coupling means between the turbine hub and the output hub of the damping device are constituted by keys.

BRIEF DESCRIPTION OF THE DRAWINGS

Other characteristics and advantages of the invention will become evident upon reading the detailed description that follows, an understanding of which may be gained by referring to the attached drawings in which:

FIGS. 5 to 10 are axial half section views of the damping device along successive sections that are depicted in FIG. 3, respectively section plane A-A for FIG. 5, section plane B-B for FIG. 6, section plane C-C for FIG. 7, section plane D-D for FIG. 8, section plane E-E for FIG. 9, and section plane F-F for FIG. 10;

FIG. 11 is an axial half section view depicting an exemplifying embodiment of synchronization means;

FIG. 12 is an axial half section view depicting, analogously to FIGS. 5 to 11, a variant implementation of the embodiment in which the turbine is linked to the second washer of the damping device;

FIG. 13 is an axial half section view depicting, analogously to FIGS. 5 to 11, a variant implementation of the embodiment in which the turbine is linked to the output element.

DETAILED DESCRIPTION

In the description hereinafter and in the claims, the terms "front" and "rear," "outer" and "inner," and the orientations "axial" and "radial" will be used, in non-limiting fashion and in order to facilitate comprehension, to designate elements of the damping device in accordance with the definitions given in the description.

Figure 1:
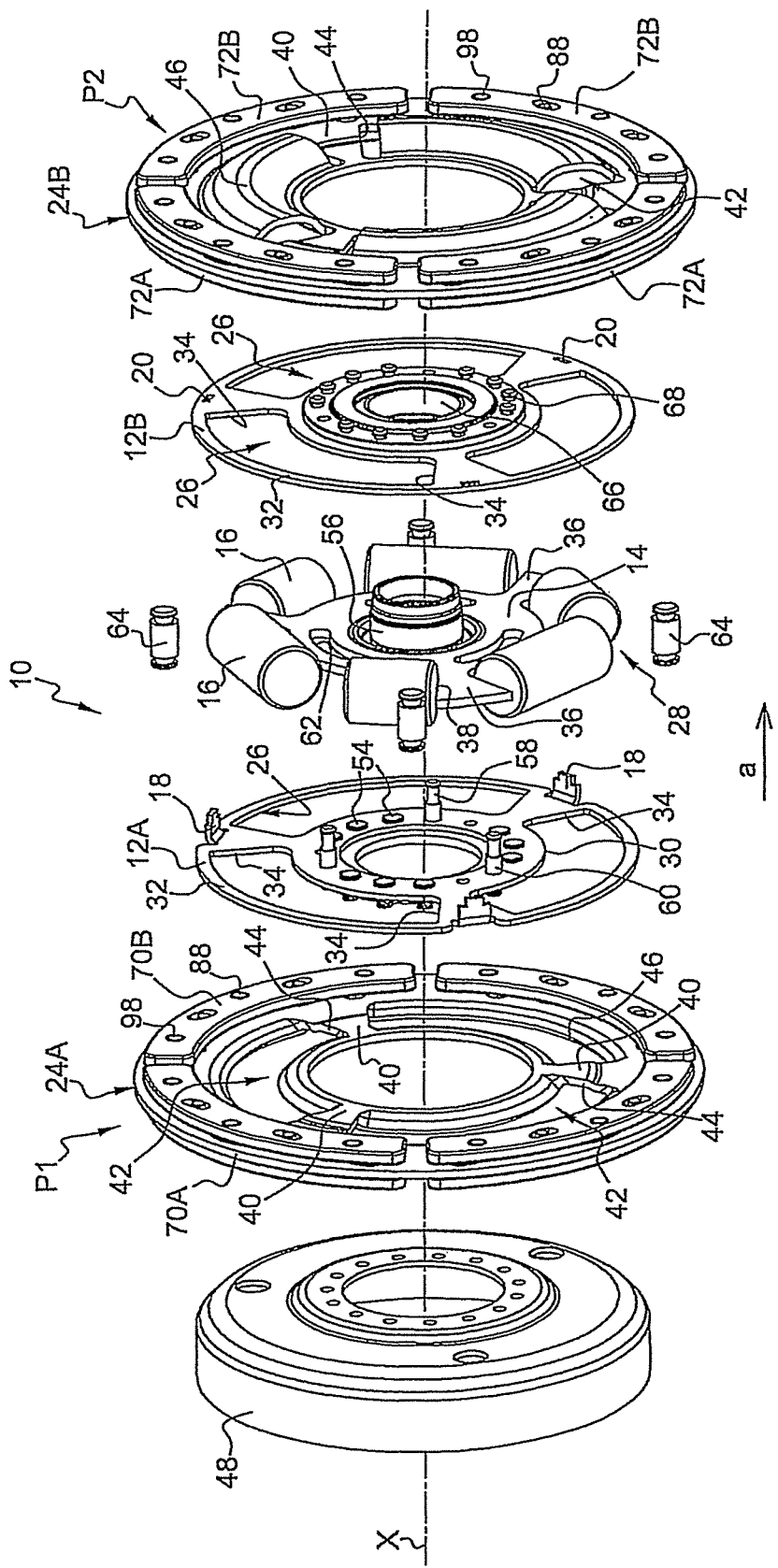
FIG. 1 is an exploded perspective view depicting an embodiment of a damping device according to the invention.

By convention, the "axial" orientation corresponds to the rotation axis of the damping device, and the "front" to "rear" direction corresponds to that indicated by arrow "a" in FIG. 1, or respectively to the left and right in FIG. 1.

The "radial" orientation is directed orthogonally to the rotation axis of the damping device from inside to outside moving away from said axis, and the "circumferential" orientation is directed orthogonally to the axis of the damping device and orthogonally to the radial direction.

The terms "outer" and "inner," like "front" and "rear," are used to define the relative position of one element with respect to another with reference to the rotation axis of the damping device; an element close to the axis is thus categorized as "inner" as opposed to an "outer" element located radially at the periphery.

For the description hereinafter, elements having similar, identical, or analogous functions will be labeled with the same reference numbers.

FIG. 1 depicts a torsion damping device 10 according to the invention that is capable of being part of a motor vehicle transmission.

In the embodiment and the variants depicted in the Figures, damping device 10 is in particular, but not exclusively, intended to be part of a hydrokinetic coupling apparatus.

In known fashion, a hydrokinetic coupling apparatus of this kind (not depicted) has principally a locking (or "lock-up") clutch, a damping device, and a coupler or, preferably, a converter.

The hydrokinetic coupling apparatus has a sealed housing made up respectively of a front part and a rear part, overall in the shape of shells that are, for example, assembled by welding.

The front and rear parts of the housing demarcate a general volume of the apparatus inside which are arranged, axially from front to rear, the locking clutch, the damping device, and the torque converter.

The torque converter has a rear impeller wheel, a front turbine wheel, and a central reaction wheel.

The impeller wheel has blades that are carried by the rear housing part which, rotationally integral with the housing front part, is capable of being rotationally linked (i.e., non-rotatable connected) to a driving shaft.

The turbine wheel likewise has blades that axially face the blades of the impeller wheel; the turbine wheel is capable of being non-rotatably connected to a driven shaft coaxially with the rotation axis of the damping device, for example by means of a hub.

In the case of application to a motor vehicle, the driving shaft is constituted by the crankshaft of the internal combustion engine of the motor vehicle, while the driven shaft is constituted by the input shaft of the vehicle's gearbox, connected to gear ratio changing means.

Damping device 10 exhibits a rotation axis X that by convention extends along the axial orientation.

As depicted in particular in FIGS. 1 to 4, damping device 10 has at least an input element 12, an output element 14, and circumferentially acting elastic members 16 that are interposed between input element 12 and output element 14.

Input element 12 is intended to be rotationally driven by a driving shaft (not depicted), such as the crankshaft of the internal combustion engine of the motor vehicle equipped with a transmission, the clutch of which, which has said damping device 10, is in the exemplifying embodiment a hydrokinetic coupling apparatus of the kind described previously.

Output element 14 is intended to be rotationally linked to a driven shaft (not depicted), such as the input shaft of the gearbox.

Input element 12 has a first input disk 12A and a second input disk 12B, respectively arranged axially in front of and behind damping device 10, and output element 14 has at least one web 22 arranged axially in a central position between said first and second disks 12A, 12B.

Web 22 is implemented here as a single part; as a variant, web 22 is implemented as two separate parts arranged parallel to one another in a central position of damping device 10.

Advantageously, the first input disk 12A and second input disk 12B are non-rotatable connected by linking means 18, 20.

The rotational linking means of first input disk 12A and second input disk 12B are constituted, for example, by at least one axial tab 18 that, integral with one 12A of the disks, is received in a complementary opening 20 configured on the other 12B of the disks.

The linking means of disks 12A, 12B preferably have three tabs 18 that are evenly distributed circumferentially on first disk 12A arranged axially at the front, i.e. at 120°, around rotation axis X of damping device 10.

In the same manner, second disk 12B arranged axially at the rear likewise has three openings 20 evenly distributed circumferentially at 120° around rotation axis X of damping device 10.

Advantageously, tabs 18 that extend axially toward the rear from first disk 12A provide a spacing function and contribute to proper positioning of the parts, in particular of first and second input disks 12A, 12B with respect to web 22 of output element 14 of damping device 10, which is interposed axially between said input disks 12A, 12B.

Damping device 10 also has at least two washers, respective a first washer 24A and a second washer 24B.

First washer 24A and second washer 24B are capable of interacting with elastic members 16.

In damping device 10, torque is transmitted by means of the circumferentially acting elastic members 16 from disks 12A and 12B forming the input element to web 22 that here forms part of output element 14.

The first and second input disks 12A, 12B each have windows 26, and web 22 has windows 28; circumferentially acting elastic members 16 that are respectively received in said windows 26 and 28 are thus interposed between input element 12 and output element 14.

Windows 26 and 28 are, for example, three in number, evenly distributed circumferentially around rotation axis X of damping device 10.

Windows 26 of input disks 12A, 12B are closed off and respectively demarcated on the one hand by an inner edge 30 and an outer edge 32 that respectively extend circumferentially, and on the other hand by two edges 34 that respectively extend radially and each connect together an end of inner edge 30 and of outer edge 32.

The three windows 26 are connected to one another by material parts at which are located, on the radial outer periphery, tabs 18 for connecting input disks 12A, 12B in such a way that each tab 18 or opening 20 is disposed circumferentially between two consecutive windows 26.

Windows 28 of web 22 of output element 14 are open radially toward the outside, and windows 28 are separated from one another by three tabs 26 in a star pattern, distributed circumferentially at 120° C., each of tabs 36 having two opposite edges 38 that interact respectively with one end of one of the circumferentially acting elastic members 16.

Preferably each window 26, 28 receives two circumferentially acting elastic members 16 and not only one, so that in the exemplifying embodiment, said elastic members 16 are six in number, distributed circumferentially in three groups of two elastic members 16.

Elastic members 16 are formed, for example, by helical springs exhibiting a circumferentially oriented principal axis. As is evident from FIG. 1, elastic members 16 are arranged in one circular row in particular around web 22.

A group of two elastic members 16 has advantages as compared with the use of a single arched elastic member 16 of equivalent length, in particular better loading of elastic members 16 substantially along their principal axis, and less sensitivity to radial forces exerted by centrifugal force.

The two elastic members 16 constituting a group must, however, be connected to one another in order to be able to function in series.

This so-called "phasing" function of elastic members 16 of a single group is ensured, in damping device 10, by first washer 24A and second washer 24B.

To achieve this, each of first and second washers 24A and 24B has phasing means 40 capable of interconnecting two elastic members 16 housed in a single window 26 of input disks 12A, 12B and a single window 28 of web 22.

First and second washers 24A and 24B have windows 42, here three in number, two consecutive windows 42 being separated from one another by a phasing means 40.

Windows 42 of first and second washers 24A and 24B are offset angularly with respect to windows 26 and 28 so that phasing means 40 are positioned between two elastic members 16, each phasing means 40 having two opposite radially oriented edges 44 that each interact with one of the two elastic members 16 of a group.

In order to ensure the phasing function, first washer 24A and second washer 24B are mounted freely rotatably with respect to input elements 12 and output elements 14.

The axial spacing distance between the two washers 24A and 24B is less than the diameter of elastic members 16.

Advantageously, first washer 24A and second washer 24B also provide a guidance function in addition to a phasing function for the circumferentially acting elastic members 16.

In a variant that is not depicted, the guidance function for the circumferentially acting elastic members 16 is provided by other supplementary parts distinct from first washer 24A and second washer 24B.

The embodiment depicted in the Figures is particularly advantageous, however, since first washer 24A and second washer 24B provide the phasing function and the guidance function; the result, besides the reduced parts count, is in particular that the overall axial size of damping device 10 is smaller.

First washer 24A and second washer 24B respectively have, at the level of windows 42, guidance means 46 capable of maintaining the circumferentially acting elastic members 16 in position both axially and radially.

The circumferentially acting elastic members 16 are loaded in particular, during operation, by forces due to centrifugal force that act along the radial direction.

In the example of a damping device 10 forming part of a hydrokinetic coupling apparatus, first input disk 12A is capable of being rotationally linked, by means of a connecting part 48, to a locking clutch (not depicted).

Figure 4:
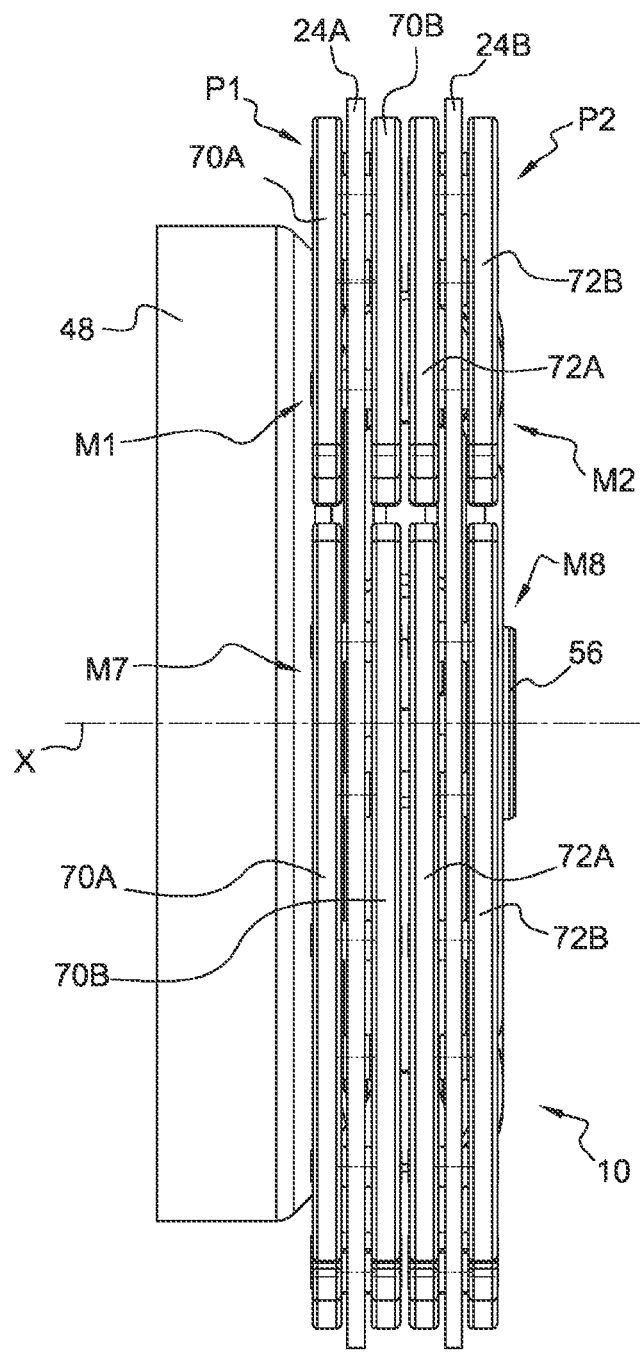
FIG. 4 is a side view of the damping device according to FIG. 1.

Visible in particular in FIGS. 1 and 4, connecting part 48 has in axial section the shape of an inverted "L" comprising a radially oriented limb and an axially oriented limb that extends to the front from the outer part of the radially oriented limb.

In the embodiment depicted in FIGS. 1 to 11, the second input disk 12B is preferably non-rotatably linked to a turbine 50 of the converter, the turbine 50 being depicted only in FIGS. 5 to 11.

During operation, when the locking clutch is in the disengaged (open) state, torque is firstly transmitted by the converter, more precisely by turbine 50, to second disk 12B, through which torque enters damping device 10 before being transmitted by web 22.

Then, when the locking clutch is in the engaged (closed) state, torque is transmitted by connecting part 48 to first input disk 12A, through which torque enters damping device 10 before being transmitted by web 22.

The locking clutch having said connecting part 48 is preferably of the multi-disk type. As a variant, the locking clutch having said connecting part 48 is of the monodisk or dual-disk type.

In known fashion, the locking clutch (not depicted) has a piston that is capable of being selectively controlled in displacement in order to clamp, or not clamp, clutch disks rotationally linked to connecting part 48 and thus to cause changes in the state of the clutch between the disengaged and engaged states.

Damping device 10 preferably has a flange 52 that is interposed axially between first input disk 12A and said connecting part 48 in the vicinity of the radially internal part of first input disk 12A and of said connecting part 48.

As a variant, flange 52 is omitted and connecting part 48 is configured to come directly into contact with first input disk 12A.

Advantageously, the result of a flange 52 of this kind is that the manufacture of connecting part 48 is simplified, and that the connection between first input disk 12A and connecting part 48, between which flange 52 is axially interposed, is strengthened.

The connection between first input disk 12A and connecting part 48 of the locking clutch, as well as flange 52 when damping device 10 has such a flange 52, is implemented by means of fastening means 54.

Fastening means 54 are preferably constituted by rivets, as a variant by any other appropriate connecting means.

Advantageously, the damping device 10 has an output hub 56 by means of which the web 22 is capable of being non-rotatably connected to the driven shaft.

Advantageously, the web 22 is fastened by welding to the output hub 56 in order to non-rotatably connect, in zero-clearance fashion, these two parts that constitute the output element 14 of the damping device 10.

The non-rotatable connection between the web 22 and the output hub 56 is preferably implemented by friction welding.

As a variant, the non-rotatable connection between the web 22 and the output hub 56 is implemented by any appropriate means, for example by geometric interaction, such as meshing between complementary teeth.

Advantageously, input element 12 and output element 14 of damping device 10 are rotationally linked with an angular deflection that is limited by abutment means 58.

Figure 5:
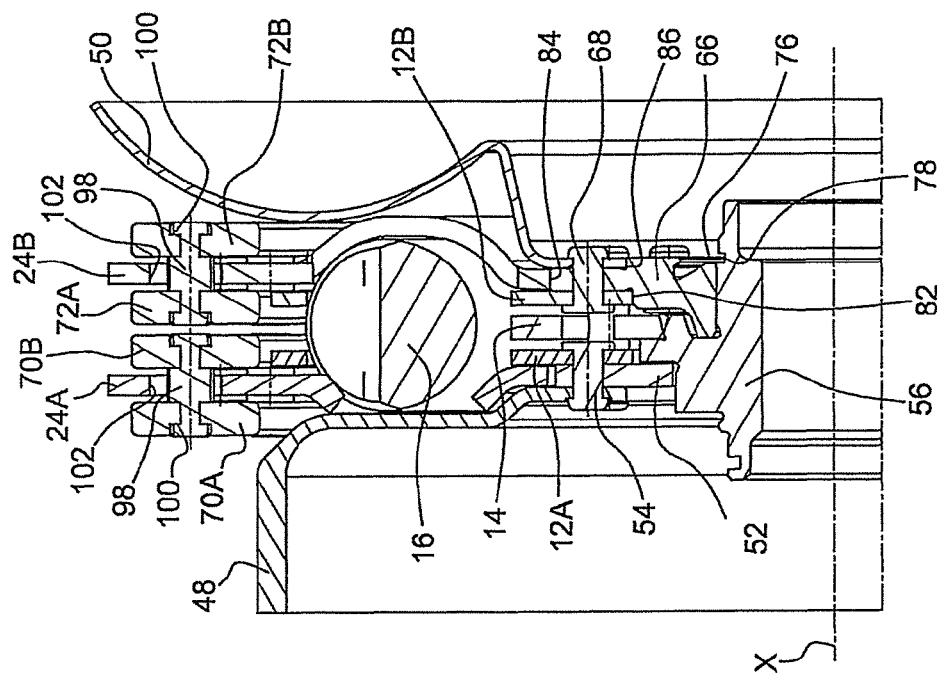

Preferably, and as depicted in FIG. 5, abutment means 58 of damping device 10 are constituted by at least one spacer interposed between the first and second input disks 12A and 12B and web 22.

Abutment means 58 are constituted, for example, by three spacers evenly distributed angularly over the circumference of the first and second input disks 12A and 12B.

Each spacer 58 has a center segment 60 that is received in an associated opening 62 of web 22, opening 62 determining the angular deflection capacity between input elements 12 and output elements 14 when central segment 60 of spacer 58 comes into abutment against one of the ends of opening 62.

Advantageously, first washer 24A and second washer 24B are rotationally linked by linking means 64.

Figure 7:
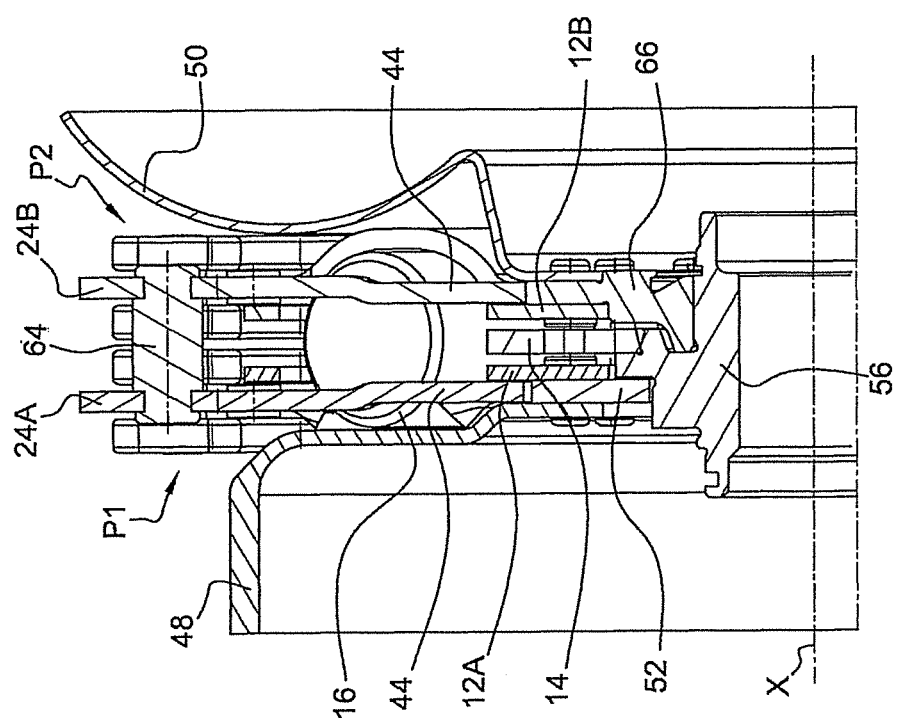

Linking means 64 between first washer 24A and second washer 24B are preferably constituted by spacers that are visible more particularly in FIG. 7.

In the exemplary embodiment depicted in FIG. 7, the second input disk 12B is linked to the turbine 50 of the converter.

Figure 6:
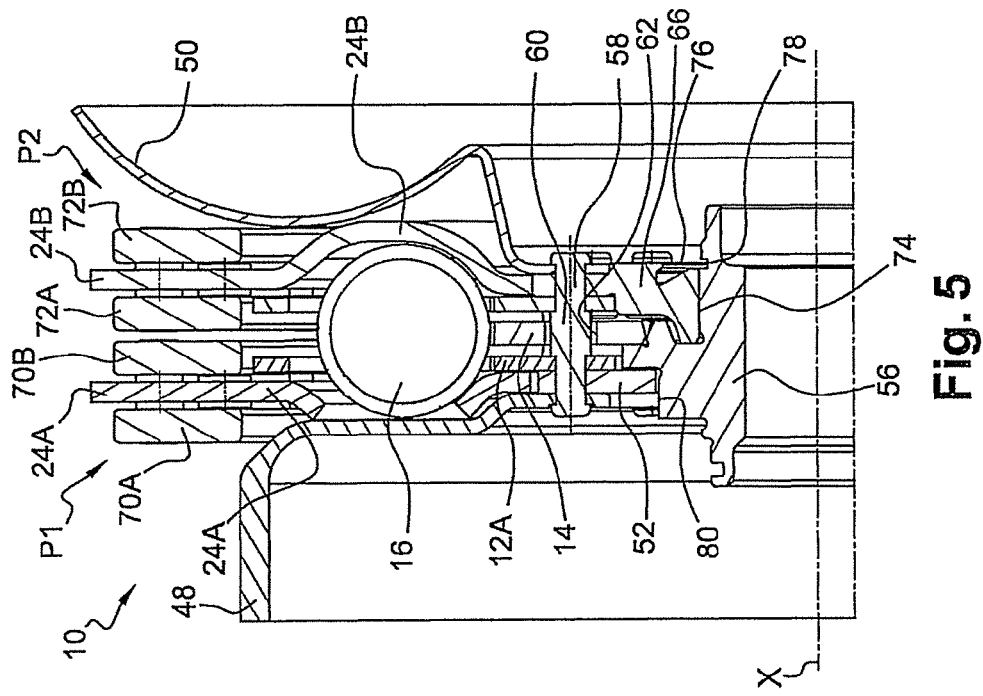
Figure 8:
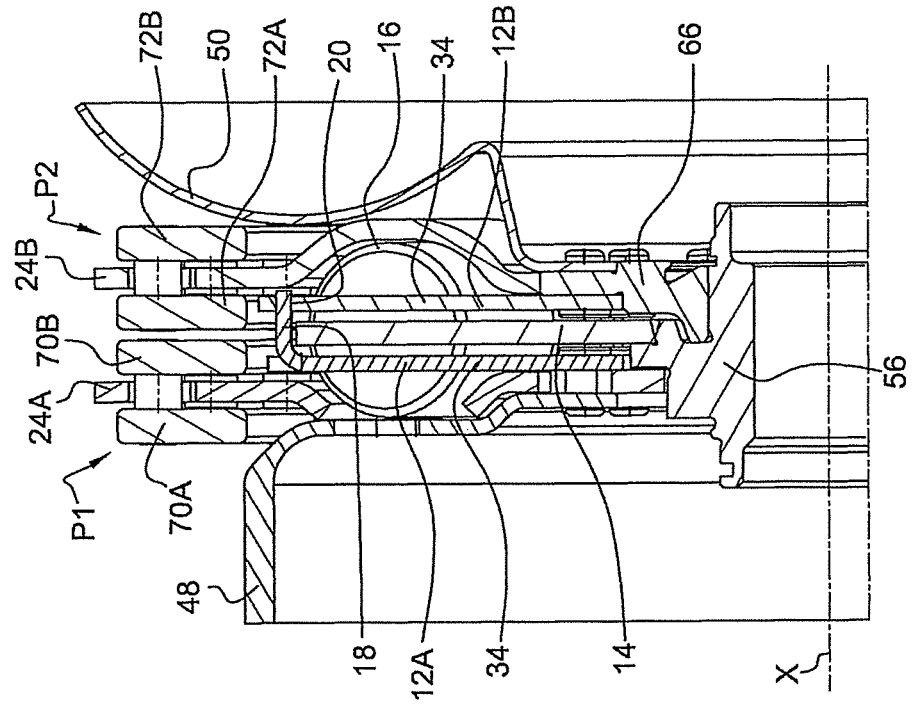

Advantageously, the damping device 10 has a turbine hub 66. The second input disk 12B, the turbine hub 66, and the turbine 50 are non-rotatably connected by fastening means 68, as depicted in FIG. 6.

The fastening means 68 are preferably constituted by rivets that interconnect the second input disk 12B, the turbine hub 66, and the turbine 50.

Spacers 58 that form the abutment means likewise perform a linking function at each of their ends, axially at the front between first input disk 12A, flange 52, and linking part 48, and axially at the rear between second input disk 12B, turbine hub 66, and turbine 50.

Each spacer 58 then therefore replaces respectively one rivet 54 at the front and one rivet 68 at the rear.

Damping device 10 has first torsion damping means constituted by the circumferentially acting elastic members 16, and second torsion damping means constituted by at least one pendulum oscillator or pendulum.

Advantageously, said first torsion damping means have a single row of elastic members 16 distributed circumferentially around rotation axis X of damping device 10.

As a variant, said first torsion damping means have two rows of elastic members 16 offset radially with respect to one another, elastic members 16 of each of the rows (or stages) preferably having different stiffness values.

According to the invention, damping device 10 has at least two pendulum oscillators constituting second torsion damping means of damping device 10.

In the embodiment depicted in the Figures, damping device 10 according to the invention has at least two pendulum oscillators, here a double pendulum oscillator.

Damping device 10 has respectively at least one first pendulum oscillator P1 carried by first washer 24A and at least one second pendulum oscillator P2 carried by second washer 24B.

Preferably each of washers 24A, 24B has a pendulum oscillator characterized by its tuning order.

As a variant that is not depicted, however, at least one of washers 24A, 24B has more than one pendulum oscillator, i.e. at least one primary pendulum oscillator and one second pendulum oscillator, each respectively characterized by a tuning order different from that of the other.

First pendulum oscillator P1 has at least one pendulum mass $M_n$ mounted oscillatingly with respect to first washer 24A, and second pendulum oscillator P2 has at least one pendulum mass $M_{n+1}$ mounted oscillatingly with respect to second washer 24B.

As a non-limiting example, a four-cylinder engine causes vibrations that exhibit a defined frequency harmonic having different harmonic orders.

According to a first design, first pendulum oscillator P1 and second pendulum oscillator P2 are tuned differently, respectively in accordance with a first tuning order for first pendulum oscillator P1 and in accordance with a second tuning order for second pendulum oscillator P2.

Advantageously, each of the first and second pendulums P1, P2 carried by an associated one of washers 24A, 24B therefore exhibits a given tuning order corresponding to a determined harmonic order.

In non-limiting fashion, in the aforementioned example of a four-cylinder engine, the vibrations having a harmonic of frequency 2 Fo are advantageously capable of being filtered by a first pendulum oscillator P1 exhibiting a tuning order of order "2" and by a second pendulum oscillator P2 exhibiting a tuning order of order "4".

In the same fashion for a six-cylinder engine, first pendulum oscillator P1 advantageously exhibits a tuning order of order "3" and second pendulum oscillator P2 exhibits a tuning order of order "6".

Depending on the application and thus on the type of engine, the vibrations to be filtered sometimes exhibit one preponderant harmonic order.

In this case, in accordance with a second design, first pendulum oscillator P1 and second pendulum oscillator P2 are able to be tuned to exhibit the same tuning order.

This is because when the harmonic order present is one that is especially preponderant with respect to the other orders, one pendulum oscillator is sometimes insufficient for achieving satisfactory filtering except by increasing the mass; for transmissions, however, the need to deal with installation constraints in the engine must be remembered.

In accordance with this second design corresponding to the embodiment of the invention depicted in the Figures, first pendulum oscillator P1 and second pendulum oscillator P2 advantageous exhibit the same tuning order, for example a tuning order of order "2" for a four-cylinder engine.

Advantageously, first pendulum oscillator P1 and second pendulum oscillator P2 are then mutually synchronized by means of synchronization means connecting said at least one pendulum mass $M_n$ of first pendulum oscillator P1 to said at least one pendulum mass $M_{n+1}$ of second pendulum oscillator P2.

In this embodiment, the value of the mass of said at least one pendulum mass $M_n$ of first pendulum oscillator P1 is preferably equal to the value of the mass of said at least one pendulum mass $M_{n+1}$ of second pendulum oscillator P2.

Preferably the values of the pendulum masses of first pendulum oscillator P1 and of second pendulum oscillator P2 are identical, as is the value of the tuning order, although the tuning order could be the same for first pendulum oscillator P1 and for second pendulum oscillator P2 even though such is not necessarily the case for the values of the pendulum masses.

As a variant, the value of the mass of said at least one pendulum mass $M_n$ of first pendulum oscillator P1 is different from the mass of said at least one pendulum mass $M_{n+1}$ of second pendulum oscillator P2.

Preferably, and as depicted in FIGS. 1 to 4, at least one of first and second pendulum oscillators P1, P2 of damping device 10 (in this case both) has an even number of pendulum masses $M_n$; $M_{n+1}$.

Advantageously, first pendulum oscillator P1 has at least one pair of pendulum masses $M_n$ having respectively one pendulum mass M1 and one pendulum mass M3.

Preferably the index "n" is an odd integer.

Preferably pendulum mass M1 and pendulum mass M3 are consequently paired.

Pendulum masses M1, M3 of first pendulum oscillator P1 are arranged circumferentially on the associated washer 24A, diametrically opposite one another.

Figure 2:
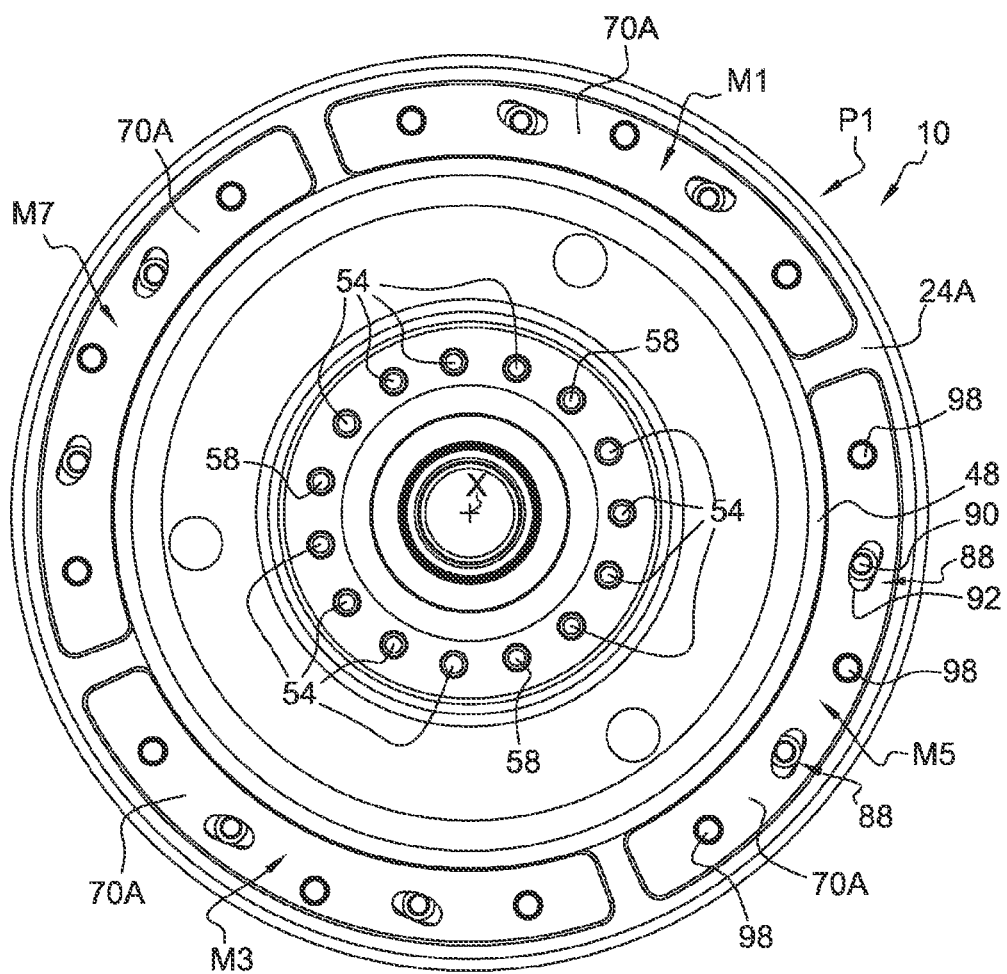
FIG. 2 is a frontal view of the damping device according to FIG. 1 from the front side corresponding to the engine side.

First pendulum oscillator P1 carried by washer 24A preferably has an even number of pendulum masses, here a total of four masses M1, M3, M5, and M7 evenly distributed circumferentially, as illustrated by FIGS. 1, 2, and 4.

Advantageously, said at least one pendulum mass $M_n$ of first pendulum oscillator P1 has at least two flyweights 70A and 70B that are arranged axially on either side of the associated washer 24A.

Each of the four masses M1, M3, M5, and M7 of first pendulum oscillator P1 has at least two flyweights 70A and 70B that are arranged axially on either side of the associated washer 24A.

The embodiment is of course given only as an example, and as a variant, first pendulum oscillator P1 has an odd number of masses $M_n$, for example three or five masses, each of said masses advantageously having two flyweights 70A and 70B that are arranged axially on either side of the associated washer 24A.

Advantageously, second pendulum oscillator P2 has at least one pair of pendulum masses $M_{n+1}$ having respectively a pendulum mass M2 and a pendulum mass M4.

Preferably, pendulum mass M2 and pendulum mass M4 are consequently paired. Pendulum masses M2, M4 of second pendulum oscillator P2 are arranged circumferentially on the associated washer 24B, diametrically opposite one another.

Figure 3:
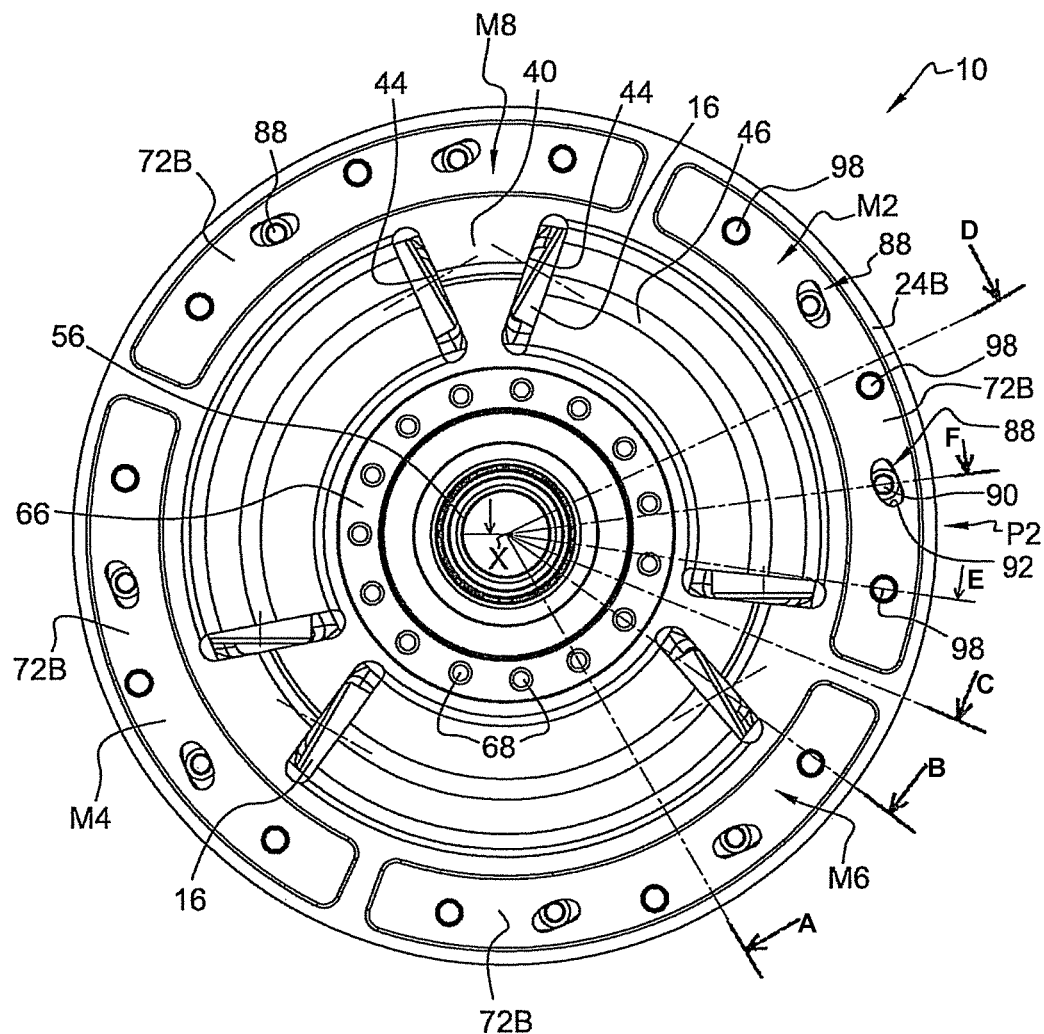
FIG. 3 is a frontal view of the damping device according to FIG. 1 from the rear side corresponding to the gearbox side.

Second pendulum oscillator P2 carried by washer 24B preferably has an even number of pendulum masses, here a total of four masses M2, M4, M6, and M8 evenly distributed circumferentially, as illustrated by FIGS. 1, 3, and 4.

Advantageously, said at least one pendulum mass $M_{n+1}$ of second pendulum oscillator P2 has at least two flyweights 72A and 72B that are arranged axially on either side of the associated washer 24B.

Each of the four masses M2, M4, M6, and M8 of second pendulum oscillator P2 has at least two flyweights 72A and 72B that are arranged axially on either side of the associated washer 24B.

As a variant, second pendulum oscillator P2 has an odd number of masses $M_n$, each of said masses advantageously having two flyweights 72A and 72B that are arranged axially on either side of the associated washer 24B.

As is evident in particular from FIG. 4, the first and second input disks 12A, 12B are arranged axially on either side of output element 14 constituted by web 22.

The axial spacing between first input disk 12A and second input disk 12B is defined by tabs 18 constituting linkage means, and is determined so as to avoid any contact with web 22.

First and second input disks 12A and 12B are respectively arranged axially between web 22 and the associated washer 24A, 24B, first washer 24A being arranged axially in front of first input disk 12A and second washer 24B being arranged axially behind second input disk 24B.

Output hub 56 has, axially at the rear, an outer cylindrical face 74 on which turbine hub 66 is mounted, turbine hub 66 being axially immobilized toward the front by a central part of output hub 56, and axially toward the rear by a snap ring 76 that is mounted in a groove 78 of output hub 56.

Output hub 56 is axially stepped and has, in front of cylindrical face 74, said central part to which web 22 is welded and, farther to the front, a cylindrical face 80.

Turbine hub 66 has, axially successively from front to rear, a cylindrical face 82 on which second input disk 12B is centered, a central cylindrical face 84 on which second washer 12B is centered, and a cylindrical face 86 on which turbine 50 is centered.

First and second pendulum oscillators P1, P2 can be implemented in a number of variant embodiments, the example that is described and depicted consequently being given in non-limiting fashion.

As depicted in FIG. 1, flyweights 70A and 70B of first pendulum oscillator P1 and flyweights 72A and 72B of second pendulum oscillator P2 are respectively arranged on the outer radial periphery of first washer 24A and of second washer 24B, in order to be subjected to a maximum centrifugal force in the course of the rotation of damping device 10 around axis X.

In the exemplifying embodiment, first pendulum oscillator P1 has four pairs of flyweights 70A, 70B corresponding to masses M1 to M7, and second pendulum oscillator P2 likewise has four pairs of flyweights 72A, 72B corresponding to masses M2 to M8.

Flyweights 70A, 70B carried by first washer 24A and flyweights 72A, 72B carried by second washer 24B are arranged radially on the same diameter, i.e. at the same distance from rotation axis X, and outside elastic members 16.

Damping device 10 is thus balanced.

As a variant, flyweights 70A, 70B of first pendulum oscillator P1 are radially offset with respect to flyweights 72A, 72B of second pendulum oscillator P2.

As a variant, the number of flyweights of first pendulum oscillator P1 is different from that of second pendulum oscillator P2, and even when each has the same number of flyweights, the value of the mass and/or of the tuning order can differ from one pendulum oscillator to another.

As depicted in FIG. 1, each of the pendulum flyweights 70A, 70B, and 72A, 72B is globally in the shape of a plate that extends in a radial plane and is curved in a circular arc so that its outer contour conforms to the outer peripheral edge of the associated washer 24.

Flyweights 70A and 70B of first pendulum oscillator P1 are preferably mounted oscillatingly with respect to first washer 24A by means of associated rolling means 88, as are flyweights 72A and 72B of second pendulum oscillator P2 with respect to second washer 24B.

Pendulum oscillators P1 and P2 are in this case analogous, so that the description provided below for one also applies to the other.

In first pendulum oscillator P1 and as illustrated in FIG. 10, the rolling means are constituted by at least one articulation peg 88, each end segment 90 of which is received in an orifice 92 of an associated pendulum flyweight 70A, 70B, said peg having a central segment 94 received slidingly in an associated guidance slot 96 of washer 24A.

Orifice 92 of each pendulum flyweight 70A, 70B is a track in which the associated end segment 90 of articulation peg 88 is received slidingly in a radial plane orthogonal to axial orientation axis X.

As illustrated in FIG. 6, first pendulum oscillator P1 likewise has at least one fastening peg 98, preferably three pegs, each end segment of fastening peg 98 being fastened to one of the pendulum flyweights 70A, 70B.

Each free axial end segment of a fastening peg 98 is fastened in an orifice 100 of an associated pendulum flyweight; pegs 98 are fastened to the flyweights by deformation of their free axial ends in the manner of a rivet, so that the two flyweights 70A and 70B for first pendulum oscillator P1 (or 72A and 72B) are rigidly fastened to one another.

Fastening peg 98 constitutes a spacer that keeps the two pendulum flyweights 70A and 70B spaced a determined axial distance apart, so that pendulum flyweights 70A, 70B do not come into contact with washer 24A.

First washer 24A has, for each fastening peg 98, an axially transversing guidance slot 102 to allow passage of the central segment of each peg 98.

FIG. 11 depicts an exemplifying embodiment of aforementioned synchronization means utilized when first pendulum oscillator P1 and second pendulum oscillator P2 exhibit the same tuning order.

First pendulum oscillator P1 and second pendulum oscillator P2 are advantageously mutually synchronized by means of synchronization means connecting said at least one pendulum mass M1 of first pendulum oscillator P1 to said at least one pendulum mass M2 of second pendulum oscillator P2.

As depicted in FIG. 11, the synchronization means are implemented, for example, in the form of a part 104 constituting a bridge that axially connects a flyweight 70B of first pendulum oscillator P1 to a flyweight 72A of second pendulum oscillator P2.

Thanks to such synchronization means 104, the first and second pendulum oscillators P1, P2 behave globally like a single pendulum oscillator.

In the preceding example of one preponderant harmonic order, it is thus possible by way of the double pendulum oscillator according to the invention to achieve particularly efficient filtering of a given harmonic order by using two pendulum oscillators that have the same tuning order and advantageously are mutually synchronized.

Such an example is of course not limiting; it is evident that a damping device 10 having at least two pendulum oscillators is equally advantageous, in particular when each pendulum oscillator exhibits a given tuning order corresponding to one of the harmonic orders.

The rotational linking of turbine 50 to damping device 10 is able to be implemented differently, in particular depending on whether or not it is desired to add the inertia of turbine 50 to an element of damping device 10.

In the embodiment depicted in FIGS. 1 to 11, the turbine 50 is non-rotatably connected to the second input disk 12B and to the second washer 24B.

FIG. 12 represents a variant embodiment in which at least the second washer 24B carrying the second pendulum oscillator P2 is non-rotatably connected to the turbine 50 of the converter.

As compared with the preceding embodiment, here turbine 50 is no longer rotationally linked to second input disk 12B, i.e. to input element 12 of damping device 10.

Specifically, first washer 24A and second washer 24B are mounted freely rotatably with respect to input elements 12 and output elements 14.

In FIG. 12, the turbine 50 is non-rotatable connected to the second washer 24B by means of fastening means 106 such as rivets.

As described earlier, the damping device 10 advantageously has a turbine hub 66 to which turbine 50 of a converter is non-rotatable connected, the turbine hub 66 being non-rotatable connected to a driven shaft directly or by means of the output hub 56 of the damping device 10.

Turbine hub 66 is rotationally linked to output hub 56 by means of coupling means, said output hub 56 on the one hand being rotationally linked to output element 14 of damping device 10, and on the other hand being capable of rotationally driving a driven shaft, in particular by gear engagement.

FIG. 13 depicts another variant in which output element 14 of damping device 10 is rotationally linked to turbine 50 directly or by means of turbine hub 66.

Turbine 50 is rotationally linked to turbine hub 66 preferably by fastening means 108 such as rivets, and turbine hub 66 is rotationally linked by coupling means 110 to the driven shaft directly or by means of an output hub 56 of damping device 10.

Coupling means 110 between turbine hub 66 and output hub 56 of damping device 10 are preferably embodied by geometric interaction, especially by means of complementary splines carried respectively by turbine hub 66 and output hub 56.

As a variant, coupling means 110 between turbine hub 66 and output hub 56 of damping device 10 are constituted by keys (not depicted).

Coupling means 110 between turbine hub 66 and output hub 56 of damping device 10 can be embodied in accordance with other variants, for example (and in a non-limiting manner) by a press fit (clamping), by welding, or also by a "bikini" fitting, i.e. by crimping and axial immobilization.

The invention claimed is:

1. A torsion damping device (10) for a motor vehicle transmission, the torsion damping device (10) having an axially oriented rotation axis (X) and comprising:
    an input element (12) capable of being rotationally driven by a driving shaft;
    an output element (14) having at least one web (22) non-rotatably connected to a driven shaft;
    circumferentially acting elastic members (16) interposed between the input element (12) and output element (14); and
    first and second washers (24A, 24B) capable of interacting with the elastic members (16) and mounted freely rotatably with respect to the input (12) and output elements (14);
    the damping device (10) having at least two pendulum oscillators, the first washer (24A) having at least one first pendulum oscillator (P1) and the second washer (24B) having at least one second pendulum oscillator (P2).

2. The device according to claim 1, wherein the first pendulum oscillator (P1) carried by the first washer (24A) has at least one pendulum mass ($M_n$) mounted oscillatingly with respect to the first washer (24A); and the second pendulum oscillator (P2) carried by the second washer (24B) has at least one pendulum mass ($M_{n+1}$) mounted oscillatingly with respect to the second washer (24B).

3. The device according to claim 2, wherein the first pendulum oscillator (P1) and the second pendulum oscillator (P2) are tuned to exhibit the same tuning order.

4. The device according to claim 3, wherein the first pendulum oscillator (P1) and the second pendulum oscillator (P2) are mutually synchronized by means of synchronization means (104) connecting said at least one pendulum mass ($M_n$) of the first pendulum oscillator (P1) to said at least one pendulum mass ($M_{n+1}$) of the second pendulum oscillator (P2).

5. The device according to claim 4, wherein said at least one pendulum mass ($M_a$, $M_{n+1}$) of at least one of said first and second pendulum oscillators (P1, P2) has at least two flyweights (70A, 70B, 72A, 72B) that are arranged axially on either side of the associated washer (24A, 24B).

6. The device according to claim 2, wherein the value of the mass of said at least one pendulum mass ($M_n$) of the first pendulum oscillator (P1) is different from the value of the mass of said at least one pendulum mass ($M_{n+1}$) of the second pendulum oscillator (P2).

7. The device according to claim 2, wherein the value of the mass of said at least one pendulum mass ($M_n$) of the first pendulum oscillator (P1) is equal to the value of the mass of said at least one pendulum mass ($M_{n+1}$) of the second pendulum oscillator (P2).

8. The device according to claim 1, wherein the first pendulum oscillator (P1) and the second pendulum oscillator (P2) are tuned differently, respectively a first tuning order for the first pendulum oscillator (P1) and a second tuning order for the second pendulum oscillator (P2).

9. The device according to claim 1, wherein the input element has a first input disk (12A) and a second input disk (12B) that are non-rotatably connected to each other by linking means (18, 20).

10. The device according to claim 9, wherein the first and second input disks (12A, 12B) are arranged axially on either side of the output element (14), and the first and second input disks (12A, 12B) are respectively arranged axially between the output element (14) and the associated washer (24A, 24B).

11. The device according to claim 1, being part of a hydrokinetic coupling apparatus having a turbine (50), wherein the input element (12) of the damping device (10) is non-rotatably linked to the turbine (50).

12. The device according to claim 1, being part of a hydrokinetic coupling device having a turbine (50), wherein at least the second washer (24B) carrying the second pendulum oscillator (P2) is non-rotatably linked to the turbine (50).

13. The device according to claim 1, being part of a hydrokinetic coupling apparatus having a turbine (50), wherein the output element (14) of the damping device (10) is non-rotatable linked to the turbine (50) directly or by means of a turbine hub (66).

* * * * *